April 7, 1942.                J. F. McCASHEN                2,278,459
METHOD OF CUTTING MATERIALS
Filed Dec. 23, 1938
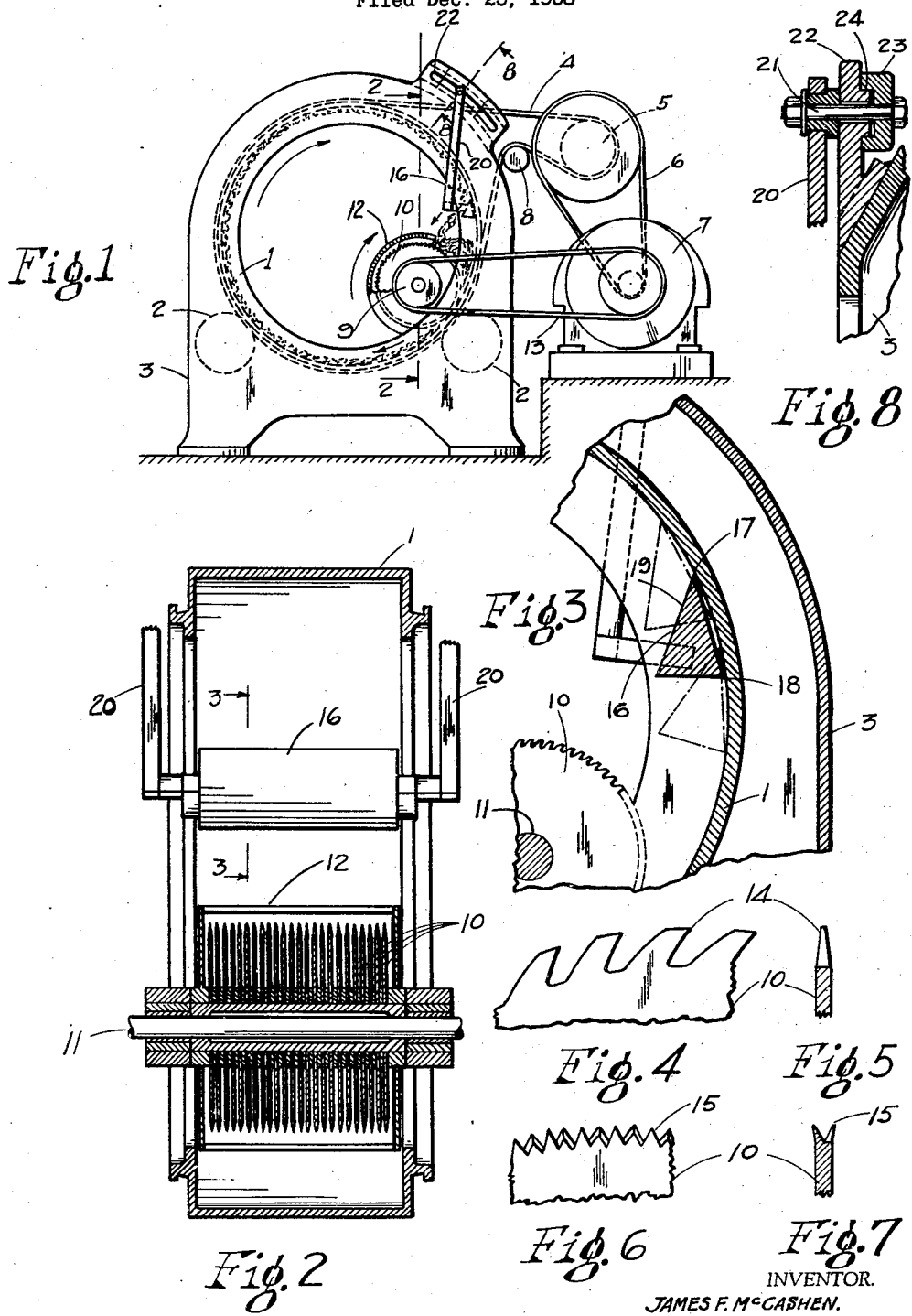
INVENTOR.
JAMES F. McCASHEN.
BY Richey Watts
ATTORNEYS.

Patented Apr. 7, 1942

2,278,459

UNITED STATES PATENT OFFICE 2,278,459

METHOD OF CUTTING MATERIALS

James F. McCashen, Cleveland Heights, Ohio, assignor to Rotary Cutters, Inc., Cincinnati, Ohio, a corporation of Ohio Application December 23, 1938, Serial No. 247,385

3 Claims. (Cl. 83—6)

This invention relates to the art of cutting materials and is particularly concerned with new and improved method of cutting oil-bearing materials for the purpose of liberating or removing the oil content.

In the drawing accompanying and forming a part of this specification,

Figure 1 is a diagrammatic, side elevational view of one form of apparatus embodying the present invention and suitable for use in carrying out the present process;

Figure 2 is a fragmentary sectional view taken on line 2—2 of Fig. 1;

Figure 3 is a fragmentary sectional view taken on line 3—3 of Fig. 3;

Figures 4 and 5 are, respectively, side and edge views of one form of a suitable, rotatable comminuting member;

Figures 6 and 7 are corresponding views of another and modified form of comminuting member; and Figure 8 is an enlarged fragmentary detail sectional view taken on line 8—8 of Fig. 1.

The apparatus shown in the drawing is generally like that of United States Patent No. 1,738,918. It has a cylinder 1 which is supported on rollers 2 carried by housing 3, so that the cylinder may rotate about its longitudinal, horizontally disposed axis. The cylinder is rotated by belt 4 which passes around the greater part of the circumference of the cylinder and is actuated by a pulley 5 driven by a belt 6, from motor 7. The idler roller 8 maintains the desired tension on the belt 4.

Within the cylinder is disposed the rotatable comminuting device generally indicated as an entirety at 9. This device 9 consists preferably of a plurality of discs 10 secured to a rotatable shaft 11, the longitudinal axis of which is horizontal and is disposed adjacent to the downwardly moving side of the cylinder and below a horizontal plane passing through the axis of cylinder 1 and well to one side of a vertical plane passing through the same axis. Preferably, the axis of device 9 is disposed on a plane passing thru the axis of the cylinder and inclined between about 30 and 60 degrees to a vertical plane passing through the axis of the cylinder 1. Device 9 is partly enclosed by housing 12 and is rotated by belt 13 from motor 7. Both cylinder 1 and device 9 rotate in the same direction, but the peripheral speed of device 9 is preferably much greater than that of cylinder 1.

The periphery of device 9 is preferably roughened, for example, as shown at 14 and 15 in Figs. 4, 5, 6 and 7. It will be noted that the roughening of discs 10, as shown in these figures, takes the form of teeth, the leading transverse surfaces of which are substantially perpendicular to the side surfaces of members 10, and that these teeth may extend forwardly from their roots to their tips in the direction of rotation. These teeth may have outwardly converging side surfaces as shown in Fig. 5, or the teeth may have "set" as in a saw and as is shown in Figs. 6 and 7.

A deflector 16 is disposed within cylinder 1 to divert the material from its travel along a circular path on the inner surface of the cylinder into contact with the comminuting means 9. The deflector shown is triangular in cross section with its apex being uppermost and with its upper and lower outer edges 17 and 18 resting against the inner surface of cylinder 1 and its inner surface 19 making an obtuse angle with the inner surface of cylinder 1. Deflector 16 is carried by opposite arms 20 rotatably mounted at their upper ends on bolts 21 which project thru slots in brackets 22 secured to housing 3 and blocks 23 which may slide on arcuate guides 24 on brackets 22. The position of deflector 16 may be adjusted by loosening nuts on bolts 21 and shifting blocks 23 and may be fixed by tightening the nuts. This apparatus permits movement of the deflector away from the inner surface of cylinder 1 and also permits adjustment of the deflector into positions at different distances from device 9.

It will be understood that by placing deflector 16 in different positions relative to device 9 the material may be deflected so as to strike device 9 more or less radially or tangentially, or between these extremes, as desired. It has been found that there is slightly less heating of the material during the comminuting operation when the material strikes device 9 substantially tangentially than when it strikes device 9 substantially radially. For example, when cocoa beans are being comminuted the temperature of the material may average about 120 degrees F., when it strikes device 9 more or less tangentially as compared with about 130 degrees F., when it strikes more or less radially. However, the speed of comminuting is most rapid when the material is so deflected to strike device 9 more or less radially.

The apparatus of the device shown in the drawing, operates substantially as follows: When the cylinder 1 and device 9 are being rotated clockwise, as indicated, a material to be comminuted is brought into the cylinder 1, preferably just above device 9 and between it and the cylinder, altho the material may be brought into contact with the inner surface of cylinder 1 below the device 9. Such material will immediately be subjected to centrifugal force by the cylinder and will be carried by the cylinder along the circular path of the inner surface of the cylinder. When the material, being so carried by the cylinder 1, comes into contact with deflector 16, the material will be deflected from the circular path of the cylinder and into contact with the roughened surfaces on device 9. These surfaces, or teeth, will forcibly intercept the thus deflected material and will throw it back onto the inner surface of the cylinder. The sizes of particles of material so intercepted will be reduced by the roughened surfaces on device 9 either by a shearing or breaking operation when the particles strike those surfaces and the edges thereof. Such portions of the material as are not intercepted by the roughened surfaces will pass between members 10 and will return to the inner surface of the cylinder by reason of their velocity or gravity, or both. Since the material is repeatedly exposed to the air while passing from the cylinder surface to the device 9 and back to that surface with violent agitation in the air, it is thoroughly aerated. Such aeration apparently has a beneficial effect on the comminuted product. It seems to improve the flavor of oils from vegetable materials.

While the above described apparatus is suitable for comminuting a wide variety of materials, it is particularly useful in comminuting oil-bearing materials from which it is desired to liberate or remove the oil content, such for example, as cocoanut meat, cocoa beans, peanuts, cotton seeds, palm kernels and in general any vegetable oil-containing materials.

In employing the apparatus and method of this invention on such materials, it has been found that when the cylinder was about 54 inches in diameter and was rotated at about 115 R. P. M. and there were about 96 members 10, each about 16 inches in diameter and spaced about ¼" and filled the space between the said flanges of the cylinder and were rotated at about 2500 R. P. M., about 100 lbs. of dried, shredded cocoanut meat could be reduced to 100 mesh screen size in about 12 minutes. Most of the oil content of the meat is liberated during such comminution and may be separated from the fibers in any suitable manner, if desired.

When cocoa beans, substantially free from hulls, are comminuted by the apparatus just described, about 200 lbs. may be reduced in about 18 minutes to particle sizes such that about 99% will pass thru a 200 mesh screen. It has been noted that when cocoa beans are being so comminuted, a white, thin vapor rises from the material during the first few, for example three, minutes of the comminuting operation and is followed by a thin, bluish vapor which continues to rise during the remainder of the operation. When the beans have been reduced to a coarse size, for example possibly 40 or 50 mesh, the material is dry but as the particles become smaller, oil is liberated and the material includes more and more liquid until, when the operation is completed, the material contains solids and liquid and has a viscosity of about 28° to 30° on a standard, MacMichael torsion wire viscosimeter.

The "chocolate liquor" so obtained has a much lower viscosity than the material obtained from the same kind of beans by prior methods, where the viscosity was about 70° to 72°. This property of low viscosity is quite valuable in the subsequent manufacture of chocolate. Apparently the different viscosities are traceable to differences in shapes of the small particles, the particles comminuted by the present method and apparatus being granular as contrasted with the flattened flake-like particles of prior methods and apparatus. Sugar and/or milk may be added to this "liquor" to make a chocolate.

Furthermore, chocolate made from cocoa beans, cut by the present process, has a distinctly different flavor and quality than chocolate obtained from cocoa beans by prior methods.

Many other materials may be reduced to particle sizes from 50 to 60 mesh down to 100 mesh or finer by the above described apparatus and method. For example, cereals such as wheat and oats may be cut with production of particles of substantial uniformity in size and with much less dust, powder or chaff than is possible with prior methods and apparatus. For example, when cereals having hulls, such as wheat, oats and the like, are comminuted by this method and apparatus, both the hulls and the kernels are reduced to small particle sizes without the production of a material amount of bran or hull chaff.

From the foregoing disclosure it will be understood by those skilled in the art that the present invention makes it possible to reduce a wide variety of different materials to particles which are substantially uniform in size and which may range in size from 50 or 60 mesh to 200 mesh; that such fine particles may be obtained much faster and cheaper than has been possible heretofore and without any harmful increase in temperature; and that the fine materials possess new and improved properties not heretofore obtainable by any prior process or apparatus.

Having thus described the present invention so that those skilled in the art may be able to understand and practice it, I state that what I desire to secure by Letters Patent is defined in what is claimed.

What is claimed is:

1. The method of cutting materials which comprises the steps of supporting and moving such material on a smooth cylindrical surface under centrifugal force in a circular vertical path surrounding planar cutting means having thin peripheral cutting edges and rotating in the same direction as, and at right angles to, said material, deflecting such material downwardly and inwardly from said supporting surface and cutting the deflected unsupported material by intercepting it with the thin peripheral cutting edges of said means.

2. The method of cutting materials which comprises the steps of supporting and moving such material on a smooth cylindrical surface under centrifugal force in a circular vertical path surrounding planar cutting means rotating in the same direction as, and at right angles to, said material, deflecting the material from said surface at such a predetermined point that it will intercept the peripheral edges of said means in the upper leading quarter portion of said means, and cutting the material while so unsupported and traveling at a high velocity by rotating said cutting means at a greater peripheral speed than the lineal speed of the unsupported material.

3. The method of cutting materials which comprises the steps of supporting and moving such material on a smooth cylindrical surface under centrifugal force in a circular vertical path surrounding rotating planar cutting means, deflecting the material from said surface at a predetermined point and at such an angle that it will intercept the peripheral edges of said means between the vertical radius of said cutting means and a radius of about 60 degrees ahead of said radius, and cutting the material while so unsupported and traveling at high velocity by rotating said cutting means at a greater peripheral speed than the lineal speed of the unsupported material.

JAMES F. McCASHEN.